UNITED STATES PATENT OFFICE.

HENRY S. SPACKMAN, OF ARDMORE, AND ELLIS W. LAZELL, OF PHILADELPHIA, PENNSYLVANIA, ASSIGNORS TO HENRY S. SPACKMAN ENGINEERING COMPANY, OF PHILADELPHIA, PENNSYLVANIA, A CORPORATION OF NEW JERSEY.

PLASTIC COMPOSITION.

No. 903,017.   Specification of Letters Patent.   Patented Nov. 3, 1908.

Application filed July 8, 1908. Serial No. 441,732.

*To all whom it may concern:*

Be it known that we, HENRY S. SPACKMAN, a resident of Ardmore, Montgomery county, and State of Pennsylvania, and ELLIS W. LAZELL, a resident of the city and county of Philadelphia, State of Pennsylvania, citizens of the United States, have made certain new and useful Inventions Relating to Plastic Compositions, of which the following is a specification.

This invention relates to plastic or cementitious compositions comprising plasters and so forth, and relates more particularly to wall plaster compositions and to the preparation thereof by the incorporation of hydraulic calcium aluminate accelerating material or the like with lime or other earthy alkali material, suitable proportions of regulating material, such as plaster of paris and of pozzuolanic or other material being incorporated, if desired.

Hydraulic calcium aluminate compounds may be readily prepared by calcining suitable mixtures of finely ground lime and bauxite or other alumina compounds, such as kaolin or high alumina clays, high alumina slag and so forth, the materials being preferably combined in such proportions that from one to three molecules of lime are present to one molecule of alumina, sufficient lime being of course added to combine with the silica or other acid components which may be present in connection with the aluminous material added to form the mixture. Such mixed materials may be rendered hydraulic and given a very quick initial set when ground and mixed with water by calcining or sintering them, and if desired the temperature may then in some cases be carried still higher so as to effect fusion. It is of course understood that iron or similar material may be used in some cases to replace to some extent at least the alumina in this accelerating material, and that other earthy alkali material such as magnesia and so forth, may be substituted for part at least of the lime combined therewith, such equivalent or substitute accelerating material being designated hydraulic earthy alkali accelerating compounds of alumina-like material.

Plastic or cementitious compositions suitable for plasters in building operations may be formed by the incorporation of a comparatively small proportion of the hydraulic calcium aluminate material or the substitute hydraulic earthy alkali accelerating compounds of alumina-like material with a large proportion of oxids or preferably hydrates of lime or similarly acting earthy alkali material, that is, free or loosely combined lime, magnesia, baryta, strontia and similar material combining or capable of combining with hydraulic calcium aluminate material and coöperating silicious material. Various proportions of controlling material and of hydraulic calcium aluminate accelerating material, for instance, which effect the desired quickness of set and increase of strength of the plastic material may of course be added and incorporated with finely divided oxid or hydrate of lime or other earthy alkali material at any time before it is used. The finely divided accelerating material may be added and incorporated by the workman before or after he gages the plastic material with water, or it may be dissolved or incorporated in the water used in gaging the earthy alkali material. Preferably, however, the accelerating material and suitable controlling material, such as sulfate of lime, sulfuric acid, molasses, glue, starch and so forth, may be uniformly incorporated with the lime or other material so as to form a finely ground plastic material becoming immediately effective when water is added thereto.

An illustrative plastic composition may be prepared by incorporating eighty-six parts of dry hydrated lime, ten parts of calcium aluminate accelerating material containing approximately forty per cent. of alumina, two parts of plaster of paris and two parts of infusorial earth. This material when the components are thoroughly incorporated and finely ground together so that ninety-five per cent. pass through a 100-mesh sieve has an initial setting time of about four hours and is completely set in about fifteen hours according to the standard Vicat needle test. A sample of this highly cementitious material when tested in the ordinary way with three parts of commercial sand in air gives the following high tensile strengths: At 7 days 125 pounds per square inch and at 28 days 151 pounds per square inch. A plaster composition having less tensile strength and therefore being more desirable as a general wall finish in building operations may be similarly prepared by incorporating 88 parts of dry hydrated lime, seven parts of hydraulic calcium aluminate accelerating material containing approximately forty per cent. of alumina, three parts of plaster of paris and two parts of basic blast furnace slag. This plaster material when tested in the ordinary way with three parts of commercial sand in air gives about fifty pounds tensile strength per square inch at seven days and about ninety pounds at twenty-eight days. When used as a plaster as much as five parts of commercial sand can be readily incorporated therewith and give the desired spreading qualities for wall finishing, the plaster hardening completely so as to allow the application of a finishing-coat in about twelve hours.

Having described this invention in connection with a number of illustrative ingredients, proportions, formulas and methods of preparation, to the details of the disclosure in this case (which is a continuation, that is, contains subject-matter taken from United States patent application, 394,916, filed September 27, 1907), the invention is not of course to be limited.

What is claimed as new and what is desired to be secured by Letters Patent is set forth in the appended claims.

1. The plaster composition comprising approximately eighty-eight parts of hydrated lime, seven parts of hydraulic calcium aluminate accelerating material containing about forty per cent. of alumina, three parts of plaster of paris and two parts of blast furnace slag.

2. The plaster composition comprising approximately eighty-eight parts of hydrated lime, seven parts of calcium aluminate accelerating material, plaster of paris controlling material and hardening material.

3. The plaster composition comprising approximately eighty-eight parts of hydrated lime, seven parts of calcium aluminate accelerating material and controlling material.

4. The plaster composition comprising a large proportion of hydrated lime with which hydraulic calcium aluminate accelerating material and controlling material have been incorporated.

5. The plaster composition comprising a large proportion of lime with which a small proportion of calcium aluminate accelerating material has been incorporated.

6. The plaster composition comprising a large proportion of earthy alkali material including lime with which a small proportion of hydraulic calcium aluminate accelerating material and controlling material has been incorporated.

7. The plaster composition comprising a large proportion of earthy alkali material with which a small proportion of calcium aluminate accelerating material and calcium sulfate controlling material has been incorporated.

8. The plaster composition comprising a large proportion of earthy alkali material with which a small proportion of calcium aluminate accelerating material has been incorporated.

9. The plaster composition comprising a large proportion of earthy alkali material with which a small proportion of hydraulic earthy alkali accelerating compounds of alumina-like material has been incorporated to increase the quickness of set and tensile strength of the composition.

10. The plaster composition comprising a large proportion of earthy alkali material including lime with which small proportions of hydraulic earthy alkali accelerating compounds of alumina-like material and of regulating material have been incorporated to increase the quickness of set and tensile strength of the composition.

11. The plaster composition comprising large proportions of lime with which a small proportion of hydraulic earthy alkali accelerating compounds of alumina-like material has been incorporated increasing the quickness of set of the composition.

12. The plaster composition containing a large percentage of earthy alkali material including lime with which calcined calcium aluminate accelerating material has been incorporated so as to add not more than ten per cent. of alumina thereto.

HENRY S. SPACKMAN.
ELLIS W. LAZELL.

Witnesses:
LILLIE FRITZ,
LOUIS F. SCHUCK.